United States Patent Office 2,937,975
Patented May 24, 1960

2,937,975
STEROID HALOHYDRINS AND PROCESS THEREFOR

Sanford K. Figdor, Forest Hills, and Gerald D. Laubach, Jackson Heights, N.Y., assignors to Chas. Pfizer & Co., Inc., New York, N.Y., a corporation of Delaware No Drawing. Filed Aug. 18, 1958, Ser. No. 755,435

13 Claims. (Cl. 167—65)

This invention relates to several new and useful steroid halohydrins as well as to a novel general process for the production of this class of compounds. In particular, it is concerned with the preparation of $\Delta^4$-3-ketosteroid halohydrins of the pregnene and pregnadiene series and it is especially concerned with the use of tertiary butyl hypohalite for these purposes. There is also included within the purview of this invention pharmaceutical compositions comprising these steroid halohydrins and pharmaceutically acceptable inert carriers.

In accordance with prior art, bromination of $\Delta^{1,4}$-3-ketosteroids with N-bromosuccinimide resulted in the introduction of the halogen atom at the 6-position of the molecule. However, employment of the analogous N-chlorosuccinimide did not afford such allylic substitution in the ring nucleus, and the use of other standard chlorinating agents resulted in the addition of chlorine to the double bond at the 4,5-positions of the molecule.

A primary object of this invention is to provide a method for introducing a halogen atom into a $\Delta^4$-3-ketosteroid having a double bond at either the 6,7- or 9,11-positions of the molecule, whereby said double bonds are attacked and halogen adds at the respective 7α- and 9α-positions of the positions of the molecule, as this has not been possible with the prior art methods. Another object of the present invention is to provide an efficient process for the production of 7α-halo and 9α-halo-$\Delta^4$-3-ketosteroids of the pregnene and pregnadiene series wherein a β-hydroxyl or acyloxyl group is adjacent to the aforesaid halogen atoms, as these compounds are therapeutically useful per se in view of their anti-inflammatory activity or they can be readily converted to the corresponding dehalo-hydroxycorticoids which are of known value. A further and more particular object of this invention is to provide pharmaceutical compositions comprising compounds which exhibit glucocorticoid activity and which are useful for the alleviation of inflammatory conditions.

In accordance with this invention, the preparation of $\Delta^4$-3-ketosteroid halohydrins of the pregnene and pregnadiene series wherein the halogen atom is at either the 7α- or 9α-position adjacent to an hydroxy or acyloxy group at the 6β- or 11β-positions, respectively, has been accomplished by treatment of the corresponding 6,7- and 9,11-dehydro compounds with the desired t-butyl hypohalite. Moreover, this process may also be applied to $\Delta^4$-3-ketosteroids of the pregnadiene and pregnatriene series wherein a double bond is present at the 16,17-positions of the molecule. This is a truly novel and unexpected result as t-butyl hypochlorite has been known in the past either as an oxidizing agent [C. A. Grob et al., Helv. Chim. Acta, vol. 36, p. 1763 (1953)], or as a C-chlorinating agent [D. Ginsburg, J. Am. Chem. Soc., vol. 73, p. 2723 (1951); vol. 75, p. 5489 (1953)], or as an N-chlorinating agent [H. Zimmer et al., J. Am. Chem. Soc., vol. 76, p. 3856 (1954)], but not as a reagent which attacks unsaturated double bonds such as those which are present in steroid ring nuclei. In particular, the process of this invention affords for the first time a class of novel $\Delta^4$-3-ketosteroid halohydrins having the general structural formula:

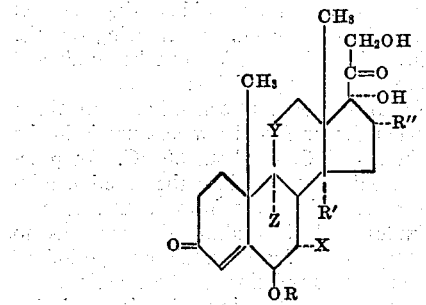

and $\Delta^1$-dehydro derivatives thereof, wherein X is a member of the group consisting of chlorine and bromine; Y is a member of the group consisting of carbonyl and β-hydroxymethylene; Z is a member of the group consisting of hydrogen and halogen; R is a member of the group consisting of hydrogen and lower aliphatic hydrocarbon acyl groups having from one to six carbon atoms; R' and R" are each members of the group consisting of hydrogen and hydroxyl; and 21-hydrocarbon carboxylic acid esters thereof wherein the acyl moiety of the ester group has from one to eight carbon atoms. Moreover, the corresponding 9α-halo-11β-acyloxy-$\Delta^4$-3-ketosteroids of the pregnene and pregnadiene series are also obtainable in good yield by this method. Specific examples of products afforded by the process of this invention include 6β-acetoxy-7α-chloro-$\Delta^4$-pregnene-17α,21-diol-3,11,20-trione 21-acetate, 9α-chloro-11β-formyloxy-$\Delta^4$-pregnene-17α,21-diol-3,20-dione 21-acetate and 6β-formyloxy-7α-chloro-$\Delta^{1,4}$-pregnadiene-17α,21-diol-3,11,20-trione 21-acetate.

In accordance with the process of this invention, a $\Delta^4$-3-ketosteroid selected from the group consisting of:

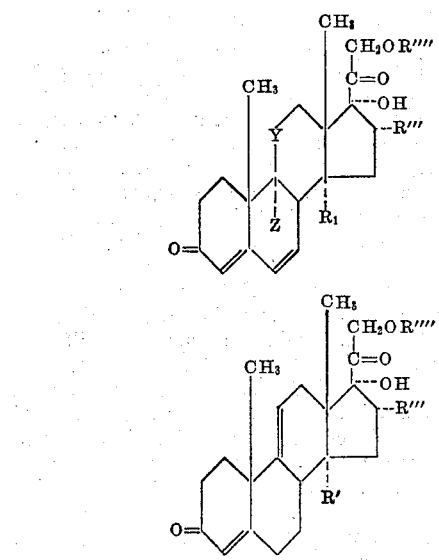

and $\Delta^1$-dehydro derivatives thereof, wherein Y is a member of the group consisting of carbonyl, methylene, β-formyloxymethylene, β-acetoxymethylene and β-trifluoroacetoxymethylene, R'" is a member of the group consisting of hydrogen, α-formyloxy and α-acetoxy, and R"" is an acyl group derived from a hydrocarbon carboxylic acid having from one to eight carbon atoms, and the other symbols have the same meaning as previously defined, is contacted in a lower aliphatic hydrocarbon monocarboxylic acid solvent medium with a halogenating agent selected from the group consisting of t-butyl hypochlorite and t-butyl hypobromite. The lower aliphatic hydrocarbon monocarboxylic acid is preferably selected from the class which includes formic acid, acetic acid, propionic acid, butyric acid, valeric acid, caproic acid, and the like.

It is desirable that the lower aliphatic hydrocarbon monocarboxylic acid solvent at least be present in sufficient amount to dissolve both the steroid starting material and the t-butyl hypohalite reagent. In carrying out the process of this invention, the reaction can be conducted at any temperature in the range of from about 15° C. to about 100° C. for from about fifteen minutes to about four hours, although the preferred temperature is in the range of from about 40° C. to about 80° C. In practice, it is most convenient to first heat the reaction mixture by means of a steam bath for from about fifteen to about thirty minutes and then allow the contents to stand at room temperature for an additional period of time in order to ensure completion of the reaction.

In general, the process of this invention is applicable to such $\Delta^{4,6}$- and $\Delta^{4,9}$-3-ketosteroids of the pregnadiene and pregnatriene series as previously indicated, particularly the 21-hydrocarbon monocarboxylic acid esters of all these compounds wherein the acyl group has from one to eight carbon atoms such as, for example, the 21-formate, acetate, propionate, butyrate, valerate, caproate, benzoate, phenylacetate, furoate, thenoate, and the like; provided that the 11$\beta$-hydroxyl groups are first blocked by means of lower acyl groups such as formyl, acetyl and preferably trifluoroacetyl groups, and the 16$\alpha$-hydroxyl groups are protected by either formyl or acetyl groups. In this connection, it is to be noted that the trifluoroacetyl blocking groups, which are introduced into the molecule at the 11$\beta$-hydroxyl position for blocking purposes, are provided by reacting the particular 11$\beta$-hydroxysteroid starting material with trifluoroacetic anhydride in accordance with the procedure described by A. L. Henne et al. in the Helv. Chim. Acta., vol. 37, pages 388 and 443 (1954); after completion of the main reaction step of this process, the blocking groups are removed by such agents as anhydrous methanol or aqueous alkali metal or alkaline-earth bicarbonates.

The 7$\alpha$- and 9$\alpha$-halocorticosteroids of this invention may be administered for therapeutic purposes either alone or in combination with a pharmaceutically acceptable carrier as an inert diluent; and such administration may be carried out either orally or parenterally, as well as topically. For instance, these compounds may be administered orally in the form of troches, lozenges, capsules, tablets and as constituents of aqueous suspensions, emulsions, syrups and elixirs, or parenterally as isotonic aqueous solutions, as well as topically in the form of such pharmaceutical preparations as salves, creams and ointments. The usual dosage for administering these compounds to adults is in the range of approximately 10–500 mg. per day, although this will vary somewhat with the weight of the subject being treated. In general, about 1.0 mg. to about 10 mg. per kg. of body weight per day is employed. For purposes of oral administration, gelatin capsules containing these steroid halohydrins together with an inert filler, such as lactose or milk sugar, are prepared, although tablets containing these steroids as the medicament together with excipients, such as starch, sugar, magnesium stearate, sodium citrate, and the like, may also be used; similarly, elixirs, syrups, emulsions or aqueous suspensions of these compounds having a sweetening or flavoring agent present are also applicable. For purposes of parenteral administration, the halogenated corticosteroids of this invention are preferably administered by means of injection as a constituent of an aqueous sterile solution which has been rendered isotonic by the addition of sufficient saline or glucose. Furthermore, they may also be administered topically in the form of ointments, creams, salves or other similar pharmaceutical bases.

Moreover, the 6$\beta$-acyloxy-7$\alpha$-halo-$\Delta^4$-3-ketosteroids of this invention are readily converted to the corresponding 7-dehalo compounds, i.e., the 6$\beta$-acyloxycorticoids, by such standard means as treatment with zinc dust in an alcoholic medium, as illustrated in the following equation:

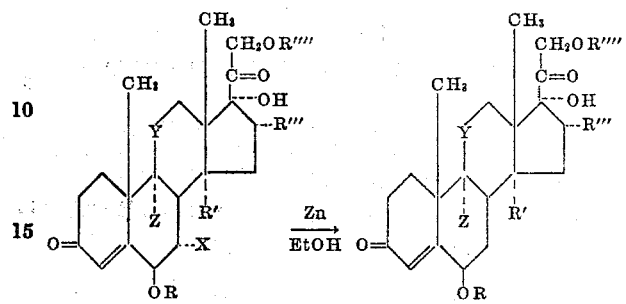

The corresponding 6$\beta$-hydroxy steroids are easily obtained by subjecting the above 6$\beta$-acyloxy compounds to saponification in accordance with standard procedures, as is also the case for the conversion of the 9$\alpha$-halo-11$\beta$-acyloxysteroids of this invention to the previously known 9$\alpha$-halo-11$\beta$-hydroxysteroids.

In accordance with a specific embodiment of the process of this invention, a $\Delta^4$-3-ketosteroid, as previously defined, is dissolved in one of the aforesaid lower aliphatic hydrocarbon carboxylic acid solvents and the resulting solution is contacted with the desired t-butyl hypohalite. In general, the amount of hypohalite employed is in the range of from about 1.0 mole to about 1.25 moles of steroid starting material. The reaction mixture is initially heated on a steam bath with stirring for from about 15 minutes to about three hours, and then allowed to stand at room temperature for an additional time period, preferably from about 15 to 30 minutes, in order to ensure completion of the reaction. The acid solvent, excess halogenating reagent and t-butanol by-product are then removed by any suitable means, such as by concentrating the reaction solution in an inert atmosphere, preferably in a nitrogen atmosphere and under reduced pressure, whereby a solid residue is obtained. Alternatively, the desired product may be isolated by means of precipitation, the latter being preferably initiated by the addition of a suitable amount of water until incipient cloud formation takes place in the solution.

Purification of the steroid halohydrins so obtained can then be carried out by washing the crystalline material with several portions of water and subsequently drying this material in vacuo over a suitable drying agent such as phosphorus pentoxide or magnesium sulfate. If so desired, purification may even be further carried out by simply dissolving the isolated product in a polar organic solvent, such as diethyl ether, chromatographing the resulting solution on a suitable column of alumina, and then leaching the column with a sequence of solvents of increasing eluant power, i.e., of increasingly ability to dislodge the adsorbed material from the adsorbate. For example, by starting with a solvent of relatively lower polarity, such as diethyl ether, and then successively employing solvent systems of increasing polarity, such as mixtures of diethyl ether and acetone, the desired products of this invention are conveniently separated or fractionated. The eluant liquid is then collected in numbered fractions each of which is evaporated for examination of the residue. The residues that are revealed to be chemically identical, as attested to by paper chromatographic analysis, can then be combined and further purified by means of recrystallization from a suitable solvent system, such as, for example, diethyl ether-acetone. In many instances, direct recrystallization of the crude reaction product from such a solvent system is sufficient for purposes of purification.

The aforementioned $\Delta^{4,6}$- and $\Delta^{4,9}$-3-ketosteroids employed as starting materials in the process of this invention are either known compounds or they are easily prepared according to procedures previously described in the chemical literature and hence, they are well-known to those skilled in the art. For example, it has been reported that certain fungi effect dehydrogenation of steroids at the 1,2-positions, a conversion that is of importance in the production of prednisone from cortisone by means of a dehydrogenating microorganism of the genus Protaminobacter. The double bond at the 6,7-positions of the steroid molecule is easily introduced by means of the chloranil-dehydrogenation techniques described by E. J. Agnello et al. in the Journal of the American Chemical Society, vol. 79, p. 1258 (1957).

Furthermore, the 9α-halo-Δ$^4$-3-ketosteroid starting materials are best prepared by dehydrating the corresponding 11β-hydroxysteroids with p-toluenesulfonic acid to afford the Δ$^{4,9}$-3-ketosteroids, followed by the formation of an epoxide ring across the double bond at the 9,11-positions of the molecule by means of hypochlorous acid and subsequent treatment of the resulting epoxy compounds with the appropriate acid of the hydrohalide series to form the desired 9α-halo-11β-hydroxysteroids; the latter compounds can then be subsequently oxidized to the corresponding 9α-halo-11-ketosteroids, if so desired. Incidentally, the Δ$^{4,9}$-3-ketosteroid starting materials obtainable as intermediates in the aforementioned series of reactions are also readily prepared from the corresponding 9α-halo-11β-hydrosteroids by treatment with potassium acetate in accordance with the procedure described by J. Fried et al. in the Journal of the American Chemical Society, vol. 79, page 1130 (1957). The 16α-hydroxyl derivatives are best prepared from the corresponding Δ$^{16(17)}$-dehydro compounds by means of osmium tetroxide in accordance with the method described by R. Criegee [Annalen, vol. 522, page 75 (1936)], for the cis-hydroxylation of olefins, whereby 16α- and 17α-hydroxyl groups are introduced across the double bond of the steroid molecule. The 14α-hydroxyl derivatives are best prepared by microbiological means; for example, P. D. Meister et al. have described at the 123rd National Meeting of the American Chemical Society at Los Angeles, California (1953), a procedure for the production of the 14α-hydroxyl derivative of compound S by means of a microorganism of the species Helicostylum piriforme. The 11-oxygenation of 17α-hydroxysteroids having a methylene group in the 11-position by means of a microorganism of the genus Stachylidium is described by G. M. Shull in U.S. Patent 2,830,937, issued on April 15, 1958.

The preparation of tertiary butyl hypochlorite is described in "Organic Syntheses," vol. 32, p. 20 (1952); t-butyl hypobromite can also be prepared in accordance with this same procedure by merely substituting bromine for chlorine.

Thus, this invention provides an economical and efficient process for the production of new and useful 6β-acyloxy-7α-halo-Δ$^4$-3-ketosteroids of the pregnene and pregnadiene series, as well as the corresponding 9α-halo-11β-acyloxy compounds, in that the herein described reaction is easily carried out in a convenient manner and that good yields are obtainable by the use of this process. As aforesaid, the novel 6β-acyloxy-7α-halocorticoid products so obtained are extremely valuable in view of their utility as therapeutic agents for the treatment of rheumatoid arthritis and other inflammatory conditions, as well as for the fact that they are readily converted to the equally useful 6β-hydroxycorticoids of the same series.

This invention is further illustrated by the following examples, which are not to be considered as imposing any limitations on the scope thereof.

*Example I*

To a suspension of 804 mg. of Δ$^{4,6}$-pregnadiene-17α, 21-diol-3,11,20-trione 21-acetate (0.002 mole) in 15 ml. of glacial acetic acid there were added 0.25 ml. of t-butyl hypochlorite (0.002 mole) and the resulting mixture was heated on a steam bath with intermittent stirring for three hours. At the end of this time period, the resulting solution was evaporated to dryness under reduced pressure and the residue so obtained was triturated with water and subsequently filtered. There was obtained 875 mg. of solid material which after two recrystallizations from acetone-diethyl ether afforded pure 6β-acetoxy-7α-chloro-Δ$^4$ - pregnene - 17α,21-diol - 3,11,20-trione 21 - acetate; M.P. 229.4–231.1° C.; λ$_{max}$ at 230 mμ(ε=13,600); [α]$_D^{25°}$+161.14° (C, 0.453 g. in 100 ml. CHCl$_3$).

*Analysis.*—Calcd. for C$_{25}$H$_{31}$O$_8$Cl: C, 60.66; H, 6.31; Cl, 7.16; 2CH$_3$CO, 17.40. Found: C, 60.33; H, 6.35; 31, 7.31; 2CH$_3$CO, 17.93.

When t-butyl hypobromite is the reagent employed in this same reaction, the product obtained is 6β-acetoxy-7α-bromo-Δ$^4$-pregnene-17α,21-diol - 3,11,20 - trione 21-acetate.

When formic acid is used in place of acetic acid in each of the above two reactions, the products obtained are 6β - formyloxy - 7α - chloro-Δ$^4$-pregnene-17α,21-diol-3, 11,20-trione 21-acetate and 6β-formyloxy-7α-bromo-Δ$^4$-pregnene-17α,21-diol-3, 11,20-trione 21-acetate, respectively.

*Example II*

To a suspension of 772 mg. of Δ$^{4,9}$-pregnadiene-17α, 21-diol-3,20-dione 21-acetate (0.0026 mole) in 15 ml. of formic acid (98–100%) there were added 0.25 ml. of t-butyl hypochlorite (0.002 mole) with constant agitation being maintained throughout the addition; the reaction was slightly exothermic and a clear solution resulted. This solution was then heated on a steam bath with constant stirring for an additional one-half hour and then allowed to stand at room temperature for three hours. At the end of this time period, the reaction solution was added dropwise to 150 ml. of ice-water. The precipitate so obtained was successively repulped, filtered and dried in vacuo over phosphorus pentoxide to afford 796 mg. of a colorless crystalline material which was subsequently recrystallized from acetone-diethyl ether to afford pure 9α-chloro-11β-formoxy-Δ$^4$-pregnene-17α,21-diol-3,20-dione 21-acetate; M.P. 207.2–209.5° C.; λ$_{max}$ at 238 mμ (ε=16,900); [α]$_D^{25°}$+180° (C, 0.5553 g. in 100 ml. CHCl$_3$).

*Analysis.*—Calcd. for C$_{24}$H$_{31}$O$_7$Cl: C, 61.73; H, 6.69; Cl, 7.59; acyl (formate and acetate), 15.43. Found: C, 60.52; H, 6.91; Cl, 7.72, 7.41; acyl (formate and acetate), 16.10.

When t-butyl hypobromite is the reagent employed in this same reaction, the product obtained is 9α-bromo-11β - formyloxy - Δ$^4$ - pregnene - 17α,21 - diol - 3,20-dione 21-acetate.

When acetic acid is used in place of formic acid in each of the above two reactions, the products obtained are 9α-chloro-11β-acetoxy-Δ$^4$-pregnene-17α,21-diol-3,20-dione 21-acetate and 9α-bromo-11β-acetoxy-Δ$^4$-pregnene-17α,21-diol-3,20-dione 21-acetate, respectively.

*Example III*

To a suspension of 400 mg. of Δ$^{1,4,6}$-pregnatriene-17α, 21-diol-3,11,20-trione 21-acetate (0.001 mole) in 6 ml. of formic acid (88%) there were added 0.12 ml. of t-butyl hypochlorite (0.002 mole). The resulting solution was heated on a steam bath with intermittent stirring for one-half hour and then allowed to stand at room temperature for an additional fifteen minutes. At the end of this period of time, the reaction solution was added dropwise to 80 ml. of ice-water and the desired product was isolated in accordance with the same procedure described in the previous example. There was obtained 300 mg. of 6β-formyloxy-7α-chloro-Δ$^{1,4}$-pregnadiene-17α,21-diol-3,11,20-trione 21-acetate which exhibited the following properties after two recrystallizations from acetate-diethyl ether: M.P. 242–246.2° C.; λ$_{max}$ at 235 mμ (ε=15,400).

*Analysis.*—Calcd. for $C_{24}H_{37}O_8Cl$: C, 60.19; H, 5.68; Cl, 7.40. Found: C, 59.88; H, 5.63; Cl, 7.34.

When t-butyl hypobromite is the reagent employed in this same reaction, the product obtained is 6β-formyloxy-7α-bromo-Δ$^{1,4}$-pregnadiene-17α-21-diol-3,11,20-trione 21-acetate.

When acetic acid is used in place of formic acid in each of the above two reactions, the products obtained are 6β-acetoxy-7α-chloro-Δ$^{1,4}$-pregnadiene-17α,21-diol-3,11,20-dione 21-acetate and 6β-acetoxy-7α-bromo-Δ$^{1,4}$-pregnadiene-17α,21-diol-3,11,20-trione 21-acetate, respectively.

Example IV

The procedure described in Example I is followed except that Δ$^{4,6}$-pregnadiene-17α,21-diol-3,20-dione 21-acetate is the starting material employed and 6β-acetoxy-7α-chloro-Δ$^4$-pregnene-17α,21-diol-3,20-dione 21-acetate is the product obtained. In the same manner, Δ$^{4,6}$-pregnadiene-11β,17α,21-triol-3,20-dione 21-acetate is converted via the 11β-trifluoroacetyl derivative to 6β-acetoxy-17α-chloro-Δ$^4$-pregnene-11β,17α,21-triol-3,20-dione 21-acetate; 9α-fluoro-Δ$^{4,6}$-pregnadiene-17α,21-diol-3,11,20-trione 21-acetate is converted to 6β-acetoxy-7α-chloro-9α-fluoro-Δ$^4$-pregnene-17α,21-diol-3,11,20-trione 21-acetate; 9α-chloro-Δ$^{4,6}$-pregnadiene-17α,21-diol-3,11,20-trione 21-acetate is converted to 6β-acetoxy-7α,9α-dichloro-Δ$^4$-pregnene-17α,21-diol-3,11,20-trione 21-acetate; 9α-bromo-Δ$^{4,6}$-pregnadiene-11β,17α,21-triol-3,20-dione 21-acetate is converted via the 11β-trifluoroacetyl derivative to 6β-acetoxy-7α-chloro-9α-bromo-Δ$^4$-pregnene-11β,17α,21-triol-3,20-dione 21-acetate; 9α-iodo-Δ$^{4,6}$-pregnadiene-17α,21-diol-3,20-dione 21-acetate is converted to 6β-acetoxy-7α-chloro-9α-iodo-Δ$^4$-pregnene-17α,21-diol-3,20-dione 21-acetate; Δ$^{4,6}$-pregnadiene-14α,17α,21-triol-3,11,20-trione 21-acetate is converted to 6β-acetoxy-7α-chloro-Δ$^4$-pregnene-14α,17α,21-triol-3,11,20-trione 21-acetate; and Δ$^{4,6}$-pregnadiene-11β,16α,17α,21-tetrol-3,20-dione 16α,21-diacetate is converted via the 11β-trifluoroacetyl derivative to 6β-acetoxy-7α-chloro-Δ$^4$-pregnene-11β,16α17α,21-tetrol-3,20-dione 16α,21-diacetate.

Example V

The procedure described in Example II is followed except that Δ$^{4,9}$-pregnadiene-14α,17α,21-triol-3,20-dione 21-acetate is the steroid starting material employed and 9α-chloro-11β-formyloxy-Δ$^4$-pregnene-14α,17α,21-triol-3,20-dione 21-acetate is the product obtained. In the same manner, Δ$^{4,9}$-pregnadiene-16α,17α,21-triol-3,20-dione 16α,21-diacetate is converted to 9α-chloro-11β-formyloxy-Δ$^4$-pregnene-16α,17α,21-triol-3,20-dione 16α,21-diacetate; Δ$^{1,4,9}$-pregnatriene-17α,21-triol-3,20-dione 21-acetate is converted to 9α-chloro-11β-formyloxy-Δ$^{1,4}$-pregnadiene-17α,21-diol-3,20-dione 21-acetate; Δ$^{1,4,9}$-pregnatriene-14α,17α,21-triol-3,20-dione 21-acetate is converted to 9α-chloro-11β-formyloxy-Δ$^{1,4}$-pregnadiene-14α,17α,21-triol-3,20-dione 21-acetate; and Δ$^{1,4,9}$-pregnatriene-16α,17α,21-triol-3,20-dione 16α,21-diacetate is converted to 9α-chloro-11β-formyloxy-Δ$^{1,4}$-pregnadiene-16α,17α,21-triol-3,20-dione 16α,21-diacetate.

Example VI

The procedure described in Example III is followed except that Δ$^{1,4,6}$-pregnatriene-17α,21-triol-3,20-dione 21-acetate is the starting material employed and 6β-formyloxy-7α-chloro-Δ$^{1,4}$-pregnadiene-17α,21-diol-3,20-dione 21-acetate is the product obtained. In the same manner, Δ$^{1,4,6}$-pregnatriene-11β,17α,21-triol-3,20-dione 21-acetate is converted via the 11β-trifluoroacetyl derivative to 6β-formyloxy-7α-chloro-Δ$^{1,4}$-pregnadiene-11β,17α,21-triol-3,20-dione 21-acetate; 9α-fluoro-Δ$^{1,4,6}$-pregnatriene-17α,21-diol-3,11,20-trione 21-acetate is converted to 6β-formyloxy-7α-chloro-9α-fluoro-Δ$^{1,4}$-pregnadiene-17α,21-diol-3,11,20-trione 21-acetate; 9α-chloro-Δ$^{1,4,6}$-pregnatriene-17α,21-diol-3,11,20-trione 21-acetate is converted to 6β-formyloxy-7α,9α-dichloro-Δ$^{1,4}$-pregnadiene-17α,21-diol-3,11,20-trione 21-acetate; 9α-bromo-Δ$^{1,4,6}$-pregnatriene-11β,17α,21-triol-3,20-dione 21-acetate is converted via the 11β-trifluoroacetyl derivative to 6β-formyloxy-7α-chloro-9α-bromo-Δ$^{1,4}$-pregnadiene-11β,17α,21-triol-3,20-dione 21-acetate; 9α-iodo-Δ$^{1,4,6}$-pregnatriene-17α,21-diol-3,20-dione 21-acetate is converted to 6β-formyloxy-7α-chloro-9α-iodo-Δ$^{1,4}$-pregnadiene-17α,21-diol-3,20-dione 21-acetate; Δ$^{1,4,6}$-pregnatriene-14α,17α,21-triol-3,11,20-trione 21-acetate is converted to 6β-formyloxy-7α-chloro-Δ$^{1,4}$-pregnadiene-14α,17α,21-triol-3,11,20-trione 21-acetate; and Δ$^{1,4,6}$-pregnatriene-11β,16α,17α,21-tetrol-3,20-dione 16α,21-diacetate is converted via the 11β-trifluoroacetyl derivative to 6β-formyloxy-7α-chloro-Δ$^{1,4}$-pregnadiene-11β,16α,17α,21-tetrol-3,20-dione 16α,21-diacetate.

Example VII

The procedures described in the previous examples are followed, employing other lower aliphatic hydrocarbon monocarboxylic acids in lieu of formic or acetic acid; such acids specifically used include propionic acid, butyric acid, valeric acid and caproic acid. In each case, the corresponding 6β-acyloxy-7α-halo- or 9α-halo-11β-acyloxy-steroid is the product afforded.

Example VIII

The procedures described in the foregoing examples are followed here except that the starting materials employed are 21-hydrocarbon carboxylic acid esters of the aforesaid Δ$^4$-3-ketosteroids other than the 21-acetate; the esters specifically employed in this case are the 21-propionate, 21-butyrate, 21-valerate, 21-caproate, 21-benzoate, 21-phenylacetate and 21-thenoate.

What is claimed is:

1. A compound selected from the group consisting of Δ$^4$-3-ketosteroid halohydrins having the following general structural formula:

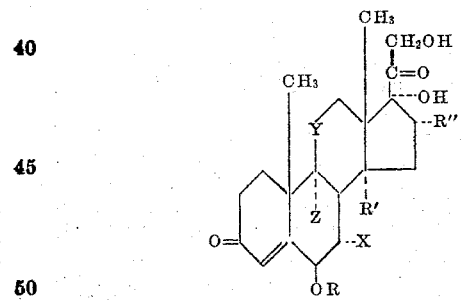

and Δ$^1$-dehydro derivatives thereof, wherein X is a member of the group consisting of chlorine and bromine; Y is a member of the group consisting of carbonyl and β-hydroxymethylene; Z is a member of the group consisting of hydrogen and halogen; R is a member of the group consisting of hydrogen and lower aliphatic hydrocarbon acyl groups having from one to six carbon atoms; R' and R" are each members of the group consisting of hydrogen and hydroxyl; and 21-hydrocarbon carboxylic acid esters thereof wherein the acyl moiety of the ester group has from one to eight carbon atoms.

2. A pharmaceutical composition comprising a compound as claimed in claim 1 and a pharmaceutically acceptable inert carrier.

3. 6β-acetoxy-7α-chloro-Δ$^4$-pregnene-17α,21-diol-3,11,20-trione 21-acetate.

4. 6β-formyloxy-7α-chloro-9α-fluoro-Δ$^{1,4}$-pregnadiene-17α,21-diol-3,11,20-trione 21-acetate.

5. 6β-formyloxy-7α-bromo-Δ$^{1,4}$-pregnadiene-17α,21-diol-3,11,20-trione 21-acetate.

6. 6β-acetoxy-7α-chloro-9α-fluoro-Δ$^4$-pregnene-17α,21-diol-3,11,20-trione 21-acetate.

7. 6β-formyloxy-7α-chloro-9α-bromo-Δ$^{1,4}$-pregnadiene-11β,17α,21-triol-3,20-dione 21-acetate.

8. A process for the production of a Δ⁴-3-ketosteroid halohydrin selected from the group consisting of:

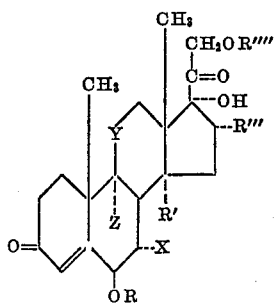

and

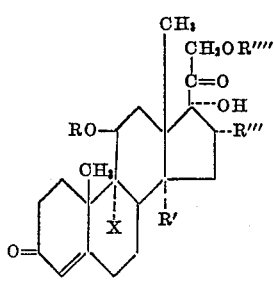

and Δ¹-dehydro derivatives thereof, wherein X is a member of the group consisting of chlorine and bromine; Y is a member of the group consisting of carbonyl, methylene, β - formyloxymethylene, β - acetoxymethylene and β - trifluoroacetoxymethylene; Z is a member of the group consisting of hydrogen and halogen; R is a member of the group consisting of hydrogen and lower aliphatic hydrocarbon acyl groups having from one to six carbon atoms; R' is a member of the group consisting of hydrogen and hydroxyl; R''' is a member of the group consisting of hydrogen, α-formyloxy and α-acetoxy; and R'''' is an acyl group derived from a hydrocarbon carboxylic acid having from one to eight carbon atoms, which comprises reacting a Δ⁴-3-ketosteroid selected from the group consisting of:

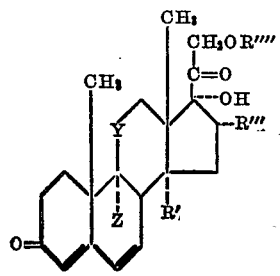

and

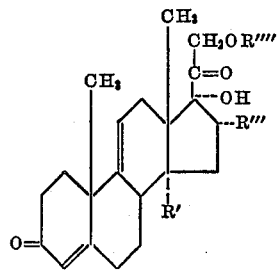

and Δ¹-dehydro derivatives thereof, in a solvent medium consisting essentially of a lower aliphatic hydrocarbon monocarboxylic acid, with a halogenating agent selected from the group consisting of t-butyl hypochlorite and t-butyl hypobromite at a temperature that is in the range of from about 15° C. to about 100° C. for from about fifteen minutes to about four hours, and thereafter recovering said product from the reaction solution.

9. The process as claimed in claim 8 wherein the Δ⁴-3-ketosteroid employed is Δ⁴,⁶-pregnadiene-17α-21-diol-3,11,20-trione 21-acetate.

10. The process as claimed in claim 8 wherein the Δ⁴-3-ketosteroid employed is Δ⁴,⁹-pregnadiene-17α-21-diol-3,20-dione.

11. The process as claimed in claim 8 wherein the Δ⁴-3-ketosteroid employed is Δ¹,⁴,⁶-pregnatriene-17α-21-diol-3,11,20-trione 21-acetate.

12. The process as claimed in claim 8 wherein the Δ⁴-3-ketosteroid employed is 9α-fluoro-Δ⁴,⁶-pregnadiene-17α,21-diol-3,11,20-trione 21-acetate.

13. The process as claimed in claim 8 wherein the Δ⁴-3-ketosteroid employed is 9α-fluoro-Δ¹,⁴,⁶-pregnatriene-17α,21-diol-3,11,20-trione 21-acetate.

References Cited in the file of this patent

UNITED STATES PATENTS

| | | |
|---|---|---|
| 2,714,599 | Fonken et al. | Aug. 2, 1955 |
| 2,787,624 | Fieser | Apr. 2, 1957 |
| 2,816,902 | Gould et al. | Dec. 17, 1957 |